Oct. 30, 1951 — V. GENTILE, JR — 2,573,430
FLOW-MEASURING DEVICE
Filed March 14, 1947
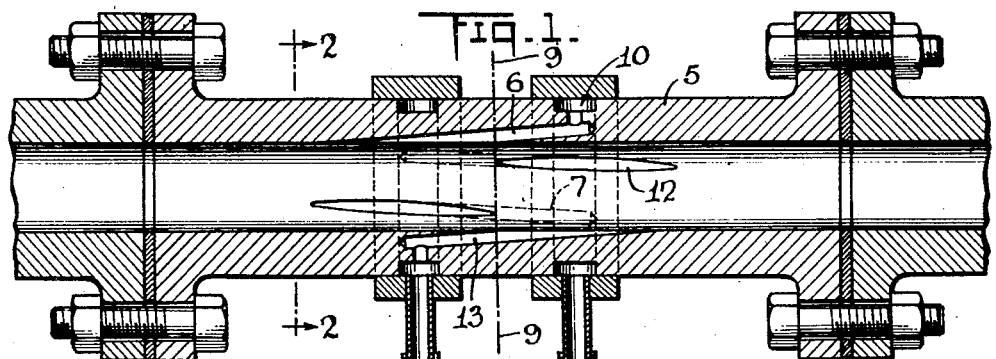
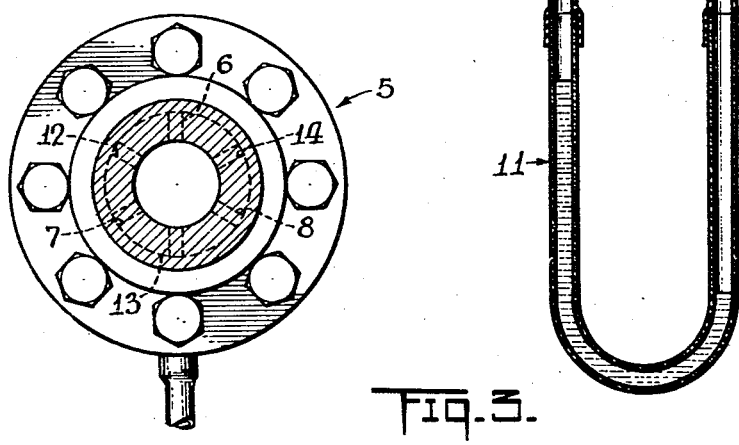
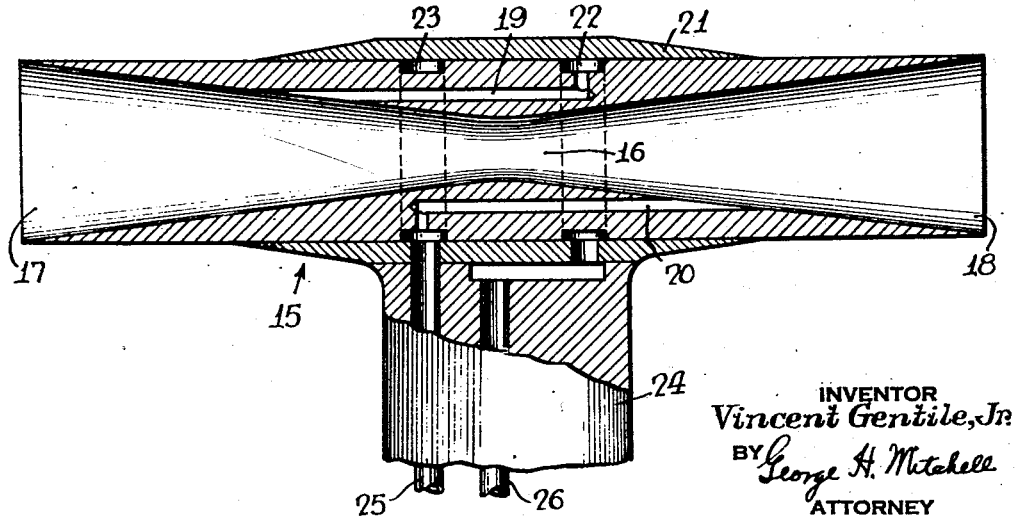
INVENTOR
Vincent Gentile, Jr.
BY George H. Mitchell
ATTORNEY Patented Oct. 30, 1951

2,573,430

UNITED STATES PATENT OFFICE 2,573,430

FLOW-MEASURING DEVICE

Vincent Gentile, Jr., Brooklyn, N. Y.

Application March 14, 1947, Serial No. 734,785

8 Claims. (Cl. 73—213)

My invention relates to flow-measuring devices in which flow is derived from differential pressures in a gaseous or liquid medium or fluid.

It is an object of my invention to provide an improved and simplified device of the character indicated—one that is compact, accurate, efficient, and suitable for a wide range of fluid-velocity measurements.

It is another object to provide a device of the character indicated in which no special projections into the fluid stream are required.

Other objects and various further features of the invention will be pointed out or will occur to those skilled in the art from a reading of the following specification in conjunction with the accompanying drawings. In said drawings:

Fig. 1 is a longitudinal sectional view of a fluid-conducting member incorporating features of the invention;

Fig. 2 is a cross-sectional view taken in the plane 2—2 of Fig. 1; and

Fig. 3 is a longitudinal sectional view of another embodiment of the invention.

In the present invention, viscous forces are used as the criterion of fluid velocity, and an introductory general discussion of principles may be helpful to a better understanding of the invention.

The tangential or boundary-layer resistance of the internal wall of a closed conduit carrying a fluid is equal to $S \times F$, in which $S$ = area of wall surface in contact with the fluid, and
$F$ = wall-surface resistance per unit of area.

This resistive force is equal in magnitude, but opposite in sense, to the dynamic pressure in the conduit, multiplied by its cross-sectional area. Expressing this in the form of an equation, $$SF = \frac{AfLV^2d}{2gM} \quad (1)$$

in which—

$A$ = cross-sectional area of the conduit,
$L$ = longitudinal length of the conduit,
$f$ = coefficient of friction,
$V$ = mean stream velocity,
$d$ = density of the fluid,
$M$ = hydraulic radius, and
$g$ = gravitational constant.

Transposing Equation 1, it follows that $$F = \frac{AfLV^2d}{2gMS} \quad (2)$$

It will be observed that for a given fluid all terms in the righthand part of Equation 2 are generally constant, with the exception of V. Even the exponent of V may be considered substantially constant at 2, at least for high Reynold's numbers. Equation 2 may, therefore, be rewritten as $$F = Kv^2 \quad (3)$$

in which K is a constant.

From Equation 3 it follows that the unit tangential drag is, in the region of turbulent flow in which my invention is to be employed, proportional to the square of the stream velocity; and differentials produced by surface drag at the boundary layer may, therefore, be expected to vary in a similar manner. Finally, since pressures produced by dynamic impact likewise vary as the square of the stream velocity, it should follow that differentials produced by a combination of viscous and dynamic forces are additive.

Briefly stated, my invention contemplates provision of a pressure-sampling passage in a conduit and inclined (at its opening to the inner wall of the conduit) with respect to the streamlines near the passage opening. In the specific forms to be described, one or a plurality of such openings are inclined to face in an upstream direction, and another one or a plurality of openings are inclined to face generally downstream; average upstream and average downstream pressures are collected, as by manifolds, and applied to a differential-pressure-indicating or measuring device.

Referring now to Figs. 1 and 2 of the drawings, my invention is shown in application to a pipe 5 of substantially constant internal diameter and in which there may be a fluid flow, say from left to right. In accordance with a feature of the invention, one or a plurality of generally upstream-directed passages 6—7—8 may be provided in the pipe 5, all opening to the inner wall of pipe 5. In the event of a plurality of openings, such as those for passages 6—7—8, it is preferred that all the points where full passage area intersects the openings lie substantially in a single plane, normal to the axis of pipe 5; this normal plane is indicated generally as 9—9 in Fig. 1. The pressures acting in passages 6—7—8 may be manifolded, as at 10, and fed, as an average pressure, to one side of a differential-pressure responsive device 11. In the form shown, the latter device is a common U-tube.

With the flow, as stated, from left to right, the total head impressed on the group of passages 6—7—8 pointing upstream should be equal to the static head in the system plus some component of the velocity head. In other words, $$H_1 = s + k'\frac{v^2}{2g} \quad (4)$$

in which $H_1$ is the total head, $s$ the static head, and $k'$ a calibration constant.

It is clear that by providing an opening in pipe 5 normal to the axis thereof (and preferably in the plane 9—9), and by applying the static pressures impressed therein directly to the other arm of the U-tube 11, the pressure differential indicated would be a direct function of the stream velocity squared. I prefer, however, to accentuate the differential indications by an application of the principles of my prior Patent No. 2,260,019, issued October 21, 1941. In accordance with these principles, I provide for downstream-directed pressure-sampling means similar to that provided for upstream-directed sampling. In the form shown, a plurality of passages 12—13—14 open into pipe 5 and are inclined generally downstream, and their manifolded pressures are applied directly to the U-tube 11, so as to register a differential with respect to the upstream pressures from passages 6—7—8. It is preferred that all the points where full-passage area of passages 12—13—14 intersect the openings of said passages into the pipe 5 should lie in a common normal plane and that this be plane 9—9; all pressure samplings, upstream-directed and downstream-directed, may then be considered to be taken in the same plane 9—9.

Under the described conditions, that is, with flow from left-to-right, the downstream-directed passages 12—13—14 will be impressed with a total head equal to the static head minus some component of the velocity head. In symbols, this head $H_2$ will be $$H_2 = s - k''\frac{v^2}{2g} \quad (5)$$

The differential head $h$ available for flow measurement may then be expressed as $$\Delta h = H_1 - H_2 = (k' + k'')\frac{v^2}{2g} \quad (6)$$

It will be seen that the inclined passages produce (in the turbulent region considered) differential pressures proportional to something approaching twice the velocity head in the system; by suitable calibration these differentials may be converted to read in any desired units of flow.

In Fig. 3 I show a modification in which the principles of the invention are applied to a conduit or pipe 15 having a constricted passage, such as a throat 16 intermediate an inlet 17 and an outlet 18. The inner wall of the pipe 15 may converge generally uniformly from inlet 17 to throat 16, and the divergence from throat 16 to the outlet 18 may also be uniform. In accordance with the invention, an upstream-directed pressure-sampling passage 19 (or a plurality thereof, circumferentially spaced, but not shown) opens to the inlet or converging part of the wall of pipe 15. The passage 19 may be substantially parallel to the axis of pipe 15 (as shown), but it will be noted that at its opening in the inner wall, it is inclined with respect to flow streamlines adjacent the openings (which, of course, will be convergent in the region considered). A similar passage 20 (or a plurality thereof) may be provided to open onto the diverging part of the inner wall. The passages 19—20 may, as in the case of Fig. 1 arrangement, be separately manifolded for attachment to a U-tube or other differential-pressure-responsive device, as will be clear.

The principles applied in the discussion of pressure heads operating in the Fig 1 arrangement will be understood to apply with similar effectiveness for the system of Fig. 2. The essential difference between differentials derived by the two systems is that in the unrestricted case (Fig. 1) the available pressures are probably those due substantially only to viscosity, whereas in the case of a constriction, such as the throat 16, pressures are likely to be the result of a combination of viscous and dynamic forces.

It will be appreciated that I have described a relatively simple flow-measuring device for the measurement of static and velocity pressures of moving fluids. The device may be easily fabricated and machined, and scale models may be reproduced with accuracy, thus simplifying calibration. If the pressure-sampling passages are inclined at substantially the same angles on opposite sides of a plane normal to the conduit axis, the device may be used for flow measurements in either direction, for with a reversal of flow only the sign of the differential is changed.

In the constant-diameter case (Fig. 1), expansive gases and vapors may be metered with the same facility as liquids, for the usual corrections (to account for changes in internal energy due to expansion) drop out of the complex adiabatic equation; this arrangement may also be particularly useful in fire-line meters, which are frequently specified to provide an unrestricted flow passage. With suitable design of the outer contours of the conduit, my invention may be employed as a speed-indicating device for moving craft, such as ships or airplanes, immersed in the free waterstream or airstream, as the case may be. The Fig. 3 arrangement shows in general that such an application may readily be made for either of the internal arrangements of passages of Figs. 1 or 3. In the form shown, a streamlined sleeve 21 embraces and closes off the recesses 22—23, which then define the pressure manifolds, and a streamlined strut 24 is provided with internal passages 25—26 to conduct the manifolded pressures to the differential-indicating equipment.

Whether or not the above statements of theory are correct, it is a fact that devices constructed in accordance with the present description have been observed to function generally as stated.

While I have described my invention in detail for the preferred form shown, it will be understood that modifications may be made within the scope of the invention as defined in the claims which follow.

I claim:

1. In apparatus of the character described, a tube having an internal bore providing a passage for the flow of fluid relative to said tube, said passage being substantially unobstructed within the inner surface of the surrounding tube wall, means for transmitting through the wall of said tube pressures corresponding to viscous forces at the inner surface of said wall during flow of said fluid through said flow passage, said means comprising a pressure-sampling passage in said tube wall and opening at one end into said flow passage at the inner surface of said wall, the axis of said pressure-sampling passage at said opening being inclined at an angle of the order of 85° with respect to a plane normal to the flow streamlines near said opening, and means communicating with the other end of said pressure-sampling passage for connecting the same to a manometer.

2. In apparatus of the character described, a tube having an internal bore providing a passage for the flow of fluid relative to said tube, said passage being substantially unobstructed within the inner surface of the surrounding tube wall, means for transmitting through the wall of said tube pressures corresponding to viscous forces at the inner surface of said wall during flow of said fluid through said flow passage, said means comprising two pressure-sampling passages in said tube wall, each of said pressure-sampling passages opening at one end into said flow passage at the inner surface of said wall, the axis of one of said pressure-sampling passages at the opening thereof into said tube being inclined at an angle of the order of 85° with respect to a plane normal to the flow stream lines near said opening, and the axis of the other of said passages at the opening thereof into said tube being inclined in the opposite direction to the first passage and at an angle to a plane normal to the flow stream lines near said opening of said other passage, and means communicating with the other ends of said pressure-sampling passages for connecting the same to a manometer.

3. In a measuring device of the character indicated, a pipe having a first plurality of passages opening to the inner wall of said pipe and inclined to a plane normal to the axis thereof, said pipe having a second plurality of passages inclined in an opposite direction to said normal plane and opening into the inner wall of said pipe, the parts of said openings which comprise full sections of said passages all lying substantially in said plane.

4. A device according to claim 3, wherein said passages are inclined at angles of the order of 85° with respect to said normal plane.

5. In a measuring device of the character indicated, a pipe having a first plurality of passages opening to the inner wall of said pipe and inclined at angles of the order of 85° to a plane normal to the flow stream lines at said openings, said pipe also having a second plurality of passages opening to the inner wall of said pipe, said second passages being inclined to a plane normal to the flow stream lines at the openings of said second passages and in the opposite direction to the inclination of the first-mentioned passages.

6. Apparatus as defined by claim 2, wherein said passage for the flow of fluid converges from an inlet to a throat and diverges from said throat to an outlet, and wherein one of said pressure sampling passages opens to the converging part of said flow passage and the other of said pressure-sampling passages opens to the diverging part of said flow passage.

7. Apparatus as defined by claim 6 wherein said pressure-sampling passages at their openings to said flow passage are substantially parallel to the axis of said tube.

8. Apparatus as defined by claim 2, wherein the internal bore providing a passage for the flow of fluid is formed by a throated inner wall in which the minimum cross-sectional area is less than that of the inlet or outlet of said tube, and wherein the first of the pressure-sampling passages opens to said wall at one side of the point of minimum cross-sectional area, the second of said pressure-sampling passages opening to another part of said wall.

VINCENT GENTILE, Jr.

REFERENCES CITED

The following references are of record in the file of this patent:

UNITED STATES PATENTS

| Number | Name | Date |
|---|---|---|
| 749,645 | Tuttle | Jan. 12, 1904 |
| 944,417 | Connet | Dec. 28, 1909 |
| 1,627,896 | Hanson | May 10, 1927 |
| 1,946,319 | Hodgson | Feb. 6, 1934 |
| 2,065,789 | Bolsinger | Dec. 29, 1936 |

FOREIGN PATENTS

| Number | Country | Date |
|---|---|---|
| 287,478 | Great Britain | July 26, 1928 |